US012008177B2

(12) United States Patent
Matsumoto

(10) Patent No.: US 12,008,177 B2
(45) Date of Patent: Jun. 11, 2024

(54) ELECTRONIC PEN, HANDWRITING INPUT DEVICE, AND CENTRAL ROD FOR ELECTRONIC PEN

(71) Applicant: Wacom Co., Ltd., Saitama (JP)

(72) Inventor: Yoshiharu Matsumoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/310,418

(22) Filed: May 1, 2023

(65) Prior Publication Data

US 2023/0273688 A1   Aug. 31, 2023

Related U.S. Application Data

(63) Continuation of application No. PCT/JP2021/037074, filed on Oct. 7, 2021.

(30) Foreign Application Priority Data

Dec. 10, 2020 (JP) ................ 2020-204732

(51) Int. Cl.
*G06F 3/0354* (2013.01)
*G06F 3/03* (2006.01)
*G06F 3/038* (2013.01)
*G06F 3/041* (2006.01)
*G06F 3/046* (2006.01)

(52) U.S. Cl.
CPC ........ *G06F 3/03545* (2013.01); *G06F 3/0383* (2013.01); *G06F 3/04162* (2019.05); *G06F 3/046* (2013.01); *G06F 3/03* (2013.01); *G06F 3/0354* (2013.01); *G06F 3/041* (2013.01)

(58) Field of Classification Search
None
See application file for complete search history.

(56) References Cited

U.S. PATENT DOCUMENTS 5,134,689 A * 7/1992 Murakami .......... G06F 3/03545
345/177
5,565,632 A * 10/1996 Ogawa ................ G06F 3/03545
73/862.041

(Continued)

FOREIGN PATENT DOCUMENTS

CN    210733639 U    6/2020
JP    H01155537 U    10/1989

(Continued)

OTHER PUBLICATIONS

English Translation of International Search Report, dated Dec. 7, 2021, for International Patent Application No. PCT/JP2021/037074. (3 pages).

*Primary Examiner* — Dorothy Harris
(74) *Attorney, Agent, or Firm* — Seed IP Law Group LLP

(57) ABSTRACT

An electronic pen is configured to transmit and receive a signal to and from a position detection sensor by electromagnetic induction. The electronic pen includes a coil and a magnetic core around which the coil is wound. The magnetic core has a through-hole in an axial center direction. The electronic pen includes a capacitor that forms a resonant circuit with the coil. The electronic pen includes a central rod that is inserted in the through-hole of the magnetic core. The central rod has a magnet part and a yoke part that holds the magnet part at a pen tip part of the central rod.

14 Claims, 6 Drawing Sheets

(56) References Cited

U.S. PATENT DOCUMENTS

| | | | | |
|---|---|---|---|---|
| 5,793,360 A * | 8/1998 | Fleck | ............ | G06F 3/023 345/157 |
| 6,853,369 B2 * | 2/2005 | Fukushima | ............ | H01G 5/16 361/283.1 |
| 10,037,089 B2 * | 7/2018 | Bishop | ............ | G06F 3/03545 |
| 2002/0134594 A1 * | 9/2002 | Taylor | ............ | G06F 3/0354 324/207.17 |
| 2004/0144575 A1 * | 7/2004 | Zloter | ............ | G06F 3/03545 178/19.02 |
| 2011/0219892 A1 | 9/2011 | Fukushima et al. | | |
| 2013/0199311 A1 * | 8/2013 | Horie | ............ | G06F 3/046 73/862.626 |
| 2014/0043283 A1 * | 2/2014 | Kim | ............ | G06F 3/046 345/174 |
| 2014/0043547 A1 * | 2/2014 | Marhefka | ............ | G06F 3/038 349/12 |
| 2014/0168175 A1 * | 6/2014 | Mercea | ............ | G06F 3/03545 345/179 |
| 2015/0109239 A1 * | 4/2015 | Mao | ............ | G06F 3/03545 345/174 |
| 2016/0202507 A1 * | 7/2016 | Ebisui | ............ | G09F 9/372 427/64 |
| 2017/0097724 A1 * | 4/2017 | Kobori | ............ | G06F 3/046 |
| 2018/0029404 A1 * | 2/2018 | Koga | ............ | B43K 23/001 |
| 2018/0246598 A1 * | 8/2018 | Sainis | ............ | G02F 1/1685 |
| 2018/0319201 A1 * | 11/2018 | Koga | ............ | B43K 8/22 |
| 2020/0341566 A1 * | 10/2020 | Ho | ............ | G06F 3/0442 |
| 2022/0137731 A1 * | 5/2022 | Matsumoto | ............ | G06F 3/0441 345/179 |
| 2022/0253210 A1 * | 8/2022 | Onoda | ............ | G06F 1/3225 |

FOREIGN PATENT DOCUMENTS

| | | | | |
|---|---|---|---|---|
| JP | 2003335094 | A | * | 11/2003 |
| JP | 2006518511 | A | | 8/2006 |
| JP | 2007206845 | A | | 8/2007 |
| JP | 2007206846 | A | | 8/2007 |
| JP | 2008281920 | A | * | 11/2008 |
| JP | 2009252048 | A | * | 10/2009 |
| JP | 2011186803 | A | | 9/2011 |
| JP | 2013161307 | A | | 8/2013 |
| JP | 2018037033 | A | | 3/2018 |

* cited by examiner

ELECTRONIC PEN, HANDWRITING INPUT DEVICE, AND CENTRAL ROD FOR ELECTRONIC PEN

BACKGROUND

Technical Field

This disclosure relates to an electronic pen and a handwriting input device configured for use with the electronic pen.

Description of the Related Art

In view of a demand to go paperless, in place of making a handwritten input on paper using a writing instrument such as a ballpoint pen or a pencil, it has become common to make an input on an input device such as a table terminal including a position detecting device equipped with a position detection sensor for detecting a position indicated by a pointer such as an electronic pen, and to store the inputted handwritten information as electronic data.

In such cases, the handwritten information inputted by the electronic pen should be visually observable by a user. Thus, in the tablet terminal, a display panel is arranged to overlay the position detection sensor, and a display control circuit is disposed to control displaying an image, which corresponds to coordinate data of positions indicated (pointed to) by the electronic pen (written traces, etc.) as detected by the position detecting device, for visual confirmation by the user on the display panel.

In these cases, as the display panel, a liquid crystal display (LCD) or an organic electroluminescence (EL) display may be used. Also, electronic paper such as an electrophoretic display panel as disclosed in Japanese Patent Laid-open No. 2007-206845 and Japanese Patent Laid-open No. 2007-206846, for example, may be used. However, these tablet terminals have a problem that their cost is high because they require a display panel and a display control circuit to display handwritten information using the coordinate data of positions indicated by the electronic pen as detected by the position detecting device.

On the other hand, in Japanese Patent Laid-open No. 2018-37033 for example, a handwriting input device is proposed that is composed of a board device and an electronic pen having a function of a writing instrument such as a ballpoint pen. The board device is formed of a plate-shaped board, inside which a position detecting device including a position detection sensor is housed. On the plate-shaped board, paper may be clipped to overlay the position detection sensor inside the plate-shaped board. The electronic pen is configured to exchange signals with the position detection sensor.

In such handwriting input device, when the writing instrument function of the electronic pen is used to make a handwriting input on paper, coordinate data of the written traces input by the handwriting is detected by the position detecting device via the position detection sensor, and the detected coordinate data may be used, for example, by being output to a personal computer, etc. or stored in an internal memory. With such handwriting input device, because the written traces input by the handwriting, which uses the writing instrument function of the electronic pen, are drawn on paper, it is not necessary to provide a display panel configured to display the handwritten information for user verification. This leads to cost reduction and is highly advantageous.

However, in the handwriting input device of Japanese Patent Laid-open No. 2018-37033, the electronic pen needs to have a function of a writing instrument such as a ballpoint pen, which tends to complicate the structure of the electronic pen and to increase the fabrication cost. Further, while the handwriting input device is useful for the purpose of keeping paper on which handwritten traces are formed, when it is not necessary to keep the paper, the handwritten traces drawn on paper based on the ballpoint pen function or the like cannot be easily erased. This requires replacement of paper as needed, which is cumbersome. Further, even when a written trace on paper can be erased with an eraser, this produces eraser crumbs, which is problematic.

BRIEF SUMMARY

The disclosure provides an electronic pen and a handwriting input device that can solve the above problems In order to solve the above-described problems, there is provided an electronic pen that transmits and receives a signal to and from a position detection sensor by electromagnetic induction. The electronic pen includes a coil and a magnetic core around which the coil is wound. The magnetic core has a through-hole in the axial center direction. The electronic pen also includes a capacitor that forms a resonant circuit with the coil, and a central rod that is inserted in the through-hole of the magnetic core. The central rod has a magnet part and a yoke part that holds the magnet part at a pen tip part of the central rod.

There is also provided a handwriting input device including a position detecting device and an electronic pen. The position detecting device includes a magnetic sheet on which the color of a position changes when a magnetic pole nears or contacts the position, and a position detection sensor of an electromagnetic induction type disposed under the magnetic sheet in an overlapping manner. The electronic pen includes a coil and a magnetic core around which the coil is wound. The magnetic core has a through-hole in the axial center direction. The electronic pen also includes a capacitor that forms a resonant circuit with the coil and a central rod inserted in the through-hole of the magnetic core. The central rod has a magnet part and a yoke part that holds the magnet part at a pen tip part of the central rod. The position detection sensor of the position detecting device exchanges a signal, which has a frequency corresponding to the resonant frequency of the resonant circuit, with the resonant circuit of the electronic pen, via electromagnetic induction coupling.

The electronic pen having the above-described configuration is an electronic pen of the electromagnetic induction type and includes the resonant circuit formed of the coil and the capacitor. The magnet part and the yoke part that holds this magnet part are disposed at the pen tip part of the central rod inserted in the through-hole of the magnetic core, around which the coil is wound. The handwriting input device includes the electronic pen and the position detecting device in which the position detection sensor of the electromagnetic induction type is disposed under the magnetic sheet, on which the color of a position changes when a magnetic pole nears or contacts the position, in an overlapping manner.

Suppose that the pen tip part of the central rod of the electronic pen nears or contacts the magnetic sheet of the handwriting input device. A magnetic circuit is formed by the magnet part and the yoke part disposed at the pen tip part of the central rod of the electronic pen, and a magnetic field (magnetic flux) that acts on only the vicinity of the magnet part is generated. Then, due to the magnetic pole at the pen tip part of the central rod, the color of the position on the magnetic sheet that the pen tip part of the central rod nears or contacts changes (e.g., white becoming black or vice versa in the magnetic sheet to be described later). As a result, the trace of the pen tip part of the central rod of the electronic pen appears as a written trace on the front surface of the magnetic sheet.

At the same time, the resonant circuit of the electronic pen and the position detection sensor exchange signals via electromagnetic induction coupling. This allows for the moving location of the pen tip part of the central rod of the electronic pen to be detected as coordinate data in the position detecting device. That is, the pen tip part's moving location on the magnetic sheet is both manifested as a color change on the front surface of the magnetic sheet and detected as the coordinate data by the position detecting device.

In the handwriting input device having the above configuration, the electronic pen can be constructed to simply have the magnet part and the yoke part at the pen tip part, and no special configuration such as adding a writing instrument function as in Japanese Patent Laid-open No. 2018-37033 is unnecessary. Further, in the handwriting input device, the position detecting device is provided to eliminate the need for paper, unlike the handwriting input device described in Japanese Patent Laid-open No. 2018-37033, by including the magnetic sheet on which the color of a position changes when a magnetic pole nears or contacts the position.

Furthermore, by forming the magnetic circuit with the magnet part and the yoke part disposed at the pen tip part of the central rod and by generating a magnetic field that acts on only the vicinity of where a magnetic pole appears, it becomes possible to draw a written trace on the magnetic sheet, without interfering with the magnetic field (alternating-current magnetic field) generated by the resonant circuit of the electronic pen. For this type of magnetic sheets, a dedicated eraser can be configured, which can erase a written trace whose color was changed due to a nearing or contacting magnetic pole. The dedicated eraser may be configured to have an opposite magnetic pole so as to undo the effect of the nearing or contacting magnetic pole to restore the original color of the written trace, to thereby readily erase the written trace.

DETAILED DESCRIPTION

Overview and Basic Configuration of Handwriting Input Device

Figure 1:
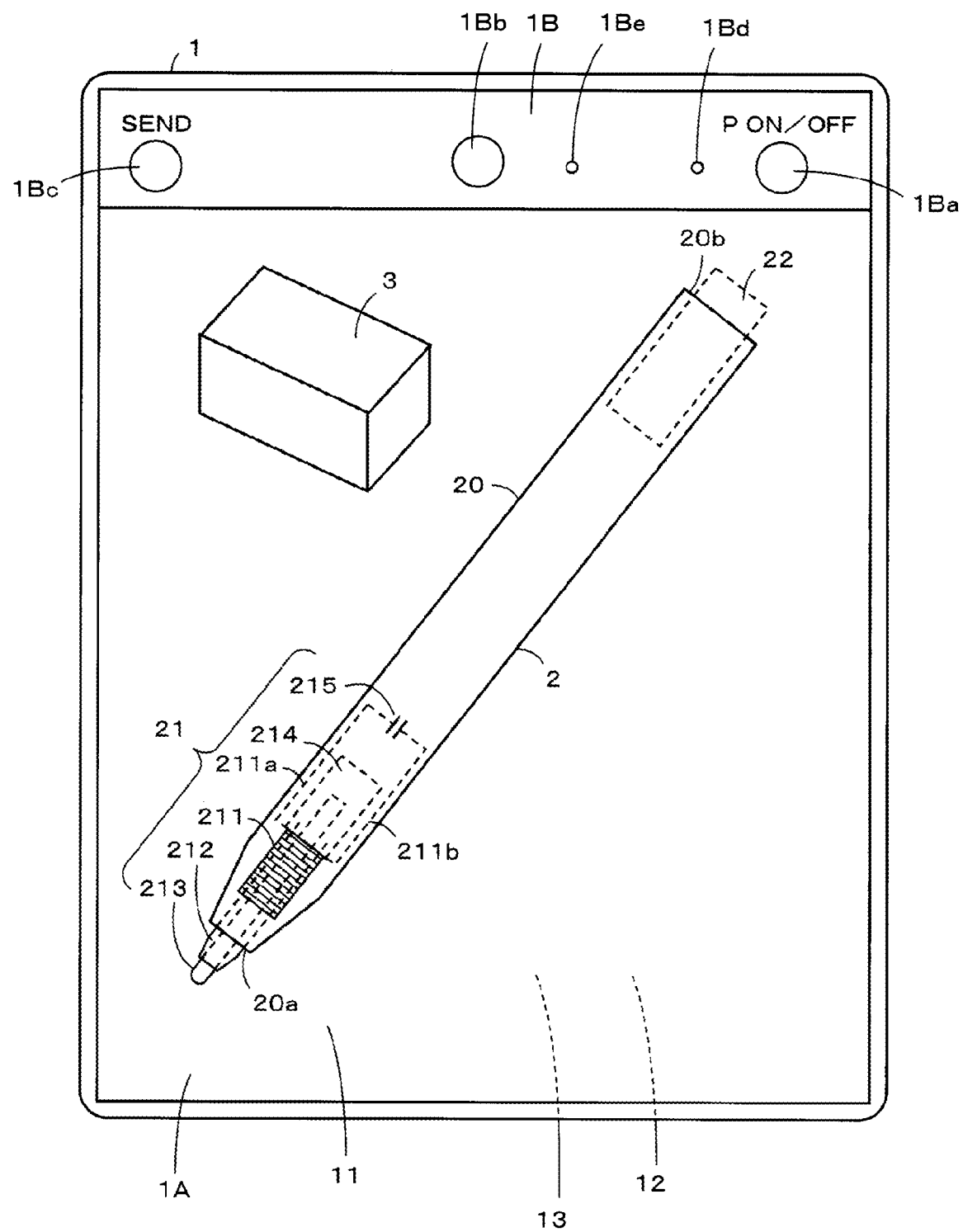
FIG. 1 is a diagram illustrating a tablet apparatus that may form a handwriting input device according to an embodiment of the disclosure.

FIG. 1 is a diagram illustrating the overall appearance of a handwriting input device according to an embodiment of the present disclosure. In the illustrated embodiment, the handwriting input device is configured to include a tablet terminal 1 and an electronic pen 2.

Configuration Example of Tablet Terminal 1

The tablet terminal 1 of this embodiment is configured to have a plate-shaped body in a thin rectangular shape with a thickness of several millimeters, for example. One flat surface of the plate-shaped body is used as a front surface, and a majority area of the front surface is used as a handwriting input region (indication input region) for the electronic pen 2. The front surface of the handwriting input region is used as a handwriting input surface (indication input surface) 1A. FIG. 1 shows the handwriting input surface 1A of the tablet terminal 1 as viewed from the top in the direction orthogonal to the handwriting input surface 1A.

In this embodiment, on the front surface of the tablet terminal 1, an operation panel part 1B is disposed in a region on the upper side of the handwriting input region. In the operation panel part 1B, operation buttons such as a power button 1Ba, a writing input finish button 1Bb, and an information transmission button 1Bc, and display indicators such as a power indicator 1Bd and a communication indicator 1Be are disposed. The power indicator 1Bd and the communication indicator 1Be are formed of a light emitting diode (LED), for example.

The tablet terminal 1 of this embodiment includes a rechargeable battery, which is not illustrated. When the power button 1B a is turned on, a drive voltage is supplied from the battery to the necessary circuit parts. The writing input finish button 1Bb is pressed when the user intends to save handwritten input data in units of pages in a storage part, as will be described later. The tablet terminal 1 of this embodiment includes a wireless communication part as described later, and transmits stored handwritten input data in units of pages to a server device formed of an external computer when the information transmission button 1Bc is pressed.

The power indicator 1Bd is configured to indicate the power-on state. The communication indicator 1Be is configured to indicate a state in which handwritten input data is being transmitted from the tablet terminal 1.

Figure 2:
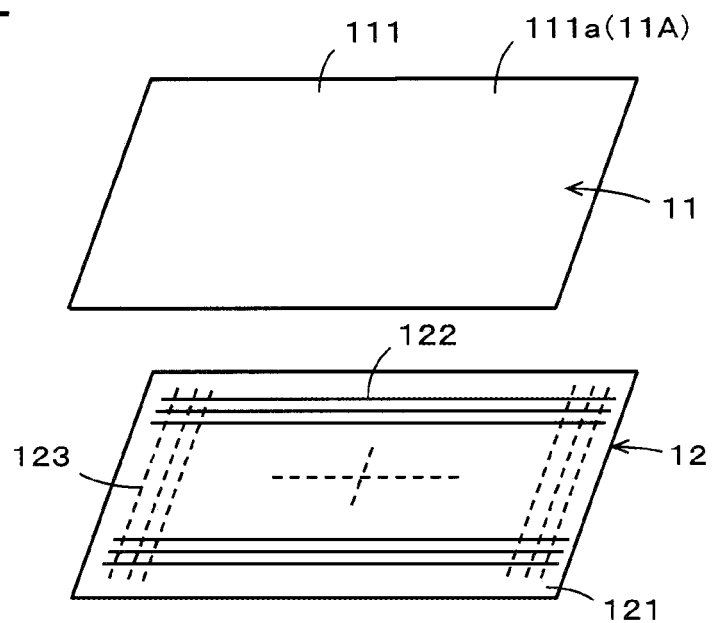
FIG. 2 is a diagram illustrating an exemplary configuration of a main portion of the handwriting input device according to the embodiment of the disclosure.
Figure 3A:
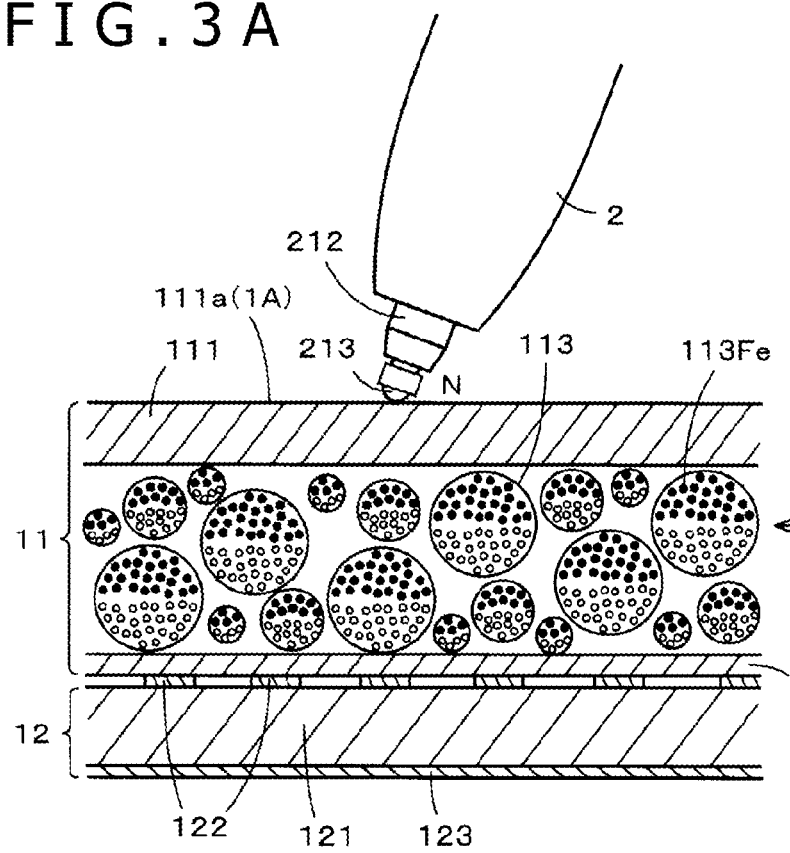
FIGS. 3A and 3B are diagrams for explaining an exemplary configuration of a main portion of the handwriting input device according to the embodiment of the disclosure.
Figure 3B:
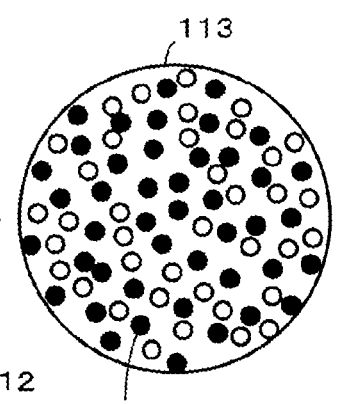

As illustrated in FIG. 2, FIG. 3A, and FIG. 3B, a magnetic sheet 11 is disposed in the handwriting input region of the tablet terminal 1. Under the magnetic sheet 11, a position detection sensor 12 is disposed to overlap with the magnetic sheet 11 in the direction orthogonal to the front surface of the tablet terminal 1.

As illustrated in FIG. 3A, the magnetic sheet 11 is configured in a sheet shape including a large number of microcapsules 113, which are filled in a gap between a sheet-shaped resin base 111 and a sheet-shaped resin base 112 formed of polyethylene terephthalate (PET), for example. The microcapsules 113 contain magnetic material powder, such as iron powder 113Fe (illustrated as black dots in FIG. 3A and FIG. 3B), in a manner such that the magnetic material powder can move or migrate within each microcapsule 113. In the illustrated example, a transparent material is used to form at least the sheet-shaped resin base 111. As the magnetic sheet 11, a magnetic sheet used for a clean writing pad Kaite™ available from PLUS Corporation of Tokyo, Japan may be used.

In this embodiment, a front surface 111a of the sheet-shaped resin base 111 of the magnetic sheet 11 serves as the handwriting input surface 1A as illustrated in FIG. 2 and FIG. 3A. In the magnetic sheet 11, when a magnetic pole is not close to or in contact with the magnetic sheet 11, the iron powder 113Fe in each microcapsule 113 exists at random as illustrated in FIG. 3B, and the entire front surface of the magnetic sheet 11, that is, the handwriting input surface 1A, exhibits a predetermined default color, such as white.

When a magnetic pole is nearing or contacting the front surface 111a of the sheet-shaped resin base 111 of the magnetic sheet 11, the iron powder 113Fe in the microcapsules 113 in the vicinity of the position that the magnetic pole is nearing or contacting is attracted toward the magnetic pole, as illustrated in FIG. 3A. Thus, at the position that the magnetic pole is nearing or contacting, the front surface of the magnetic sheet 11, that is, the handwriting input surface 1A, assumes the color of the iron powder 113Fe, such as black. The iron powder 113Fe in the microcapsules 113 retains its position even after the magnetic pole is subsequently removed. Therefore, when the magnetic pole nearing or contacting the front surface of the magnetic sheet 11 moves, a trace of the movement appears as a black line on the front surface of the magnetic sheet 11.

The handwriting input device of this embodiment may be equipped with an eraser 3 that returns the state of the iron powder 113Fe in the microcapsules 113, from a state of being magnetically attracted toward the front surface of the magnetic sheet 11 of the tablet terminal 1 (FIG. 3A), to the state of irregular (random) position as illustrated in FIG. 3B. The eraser 3 may include an erasing magnet as well known in the art, and may be capable of erasing an entire region of a predetermined size or erasing only a portion of a written trace by using a corner of the eraser 3.

The position detection sensor 12 is disposed on the back surface side of the magnetic sheet 11 to overlap with the magnetic sheet 11, as described above. In the tablet terminal 1, a position detecting device 13, which includes a position detecting circuit to be described later and other electronic parts, is disposed in a region on the back side of the position detection sensor 12 and in a region on the back side of the operation panel part 1B. In this embodiment, the position detection sensor 12 forms part of the position detecting device 13.

The position detecting device 13 of this embodiment is a position detecting device of an electromagnetic induction type. The position detection sensor 12 and the electronic pen 2 form electromagnetic induction coupling and perform signal interaction accordingly, as will be more fully described later. Based on the signal interaction between the position detection sensor 12 and the electronic pen 2, the position detecting device 13 detects a coordinate position on the handwriting input surface 1A indicated by the electronic pen 2.

In the position detection sensor 12 according to the present embodiment, electrode conductors are disposed on a flexible sheet 121 formed of an insulating material, to thereby configure a plurality of loop coils as illustrated in FIG. 3A. In this embodiment, on the flexible sheet 121, a plurality of X-axis direction loop coils are disposed at a predetermined pitch in the horizontal direction of the handwriting input surface 1A (X-axis direction), and a plurality of Y-axis direction loop coils are disposed at a predetermined pitch in the vertical direction (Y-axis direction).

In this embodiment, in order to avoid overlapping of the electrode conductors that are arranged in the directions orthogonal to each other in order to configure the X-axis direction loop coils and the Y-axis direction loop coils, electrode conductors 122 and 123 are formed on the front surface and the back surface of the flexible sheet 121 as illustrated in FIG. 3A. The X-axis direction loop coils and the Y-axis direction loop coils are formed on the flexible sheet 121 by using through-holes (not illustrated) that penetrate the flexible sheet 121. In FIG. 2, on the flexible sheet 121 of the position detection sensor 12, the electrode conductors 122 and 123 are shown as conductors having a straight line shape for ease of illustration, though they in practice form loop coils according to the present embodiment (see FIG. 7 to be described later).

Configuration Example of Electronic Pen 2

In this embodiment, the electronic pen 2 allows the position detecting device 13 of the tablet terminal 1 to detect the position indicated by the electronic pen 2, by transmitting and receiving a signal to and from the position detection sensor 12 of the position detecting device 13 of the tablet terminal 1 via the electromagnetic induction coupling as described above. The mechanical configuration of the electronic pen 2 of this embodiment can be made similar to the configuration of a known electronic pen of the electromagnetic induction type, except that a magnet part and a yoke part are disposed at the pen tip of a central rod 213. Thus, here only the configuration of the main portion of the electronic pen 2 will be described, and description of the configuration of other portions is omitted.

As illustrated in FIG. 1, the electronic pen 2 of this embodiment includes an electronic pen main part 21, which is arranged on the side of one opening 20a in the axial center direction of a hollow part of a tubular casing 20 composed, for example, of resin. The electronic pen main part 21 is configured to include a coil 211, a magnetic core (i.e., a ferrite core 212 in this example) around which the coil 211 is wound, the central rod 213, a writing pressure detecting part 214, and a capacitor 215 that forms a resonant circuit with the coil 211.

Figure 4A:
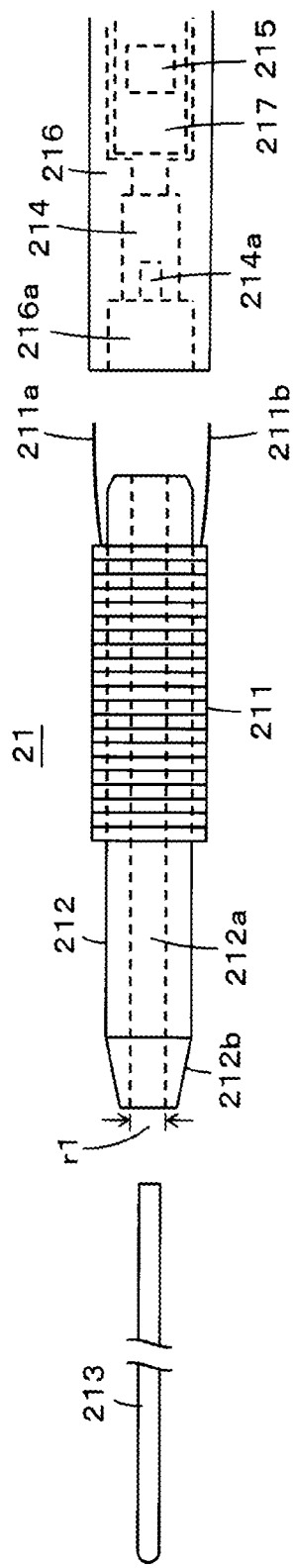
FIGS. 4A and 4B are diagrams for explaining an exemplary configuration of a main portion of an electronic pen, which forms the handwriting input device according to the embodiment of the disclosure.
Figure 4B:
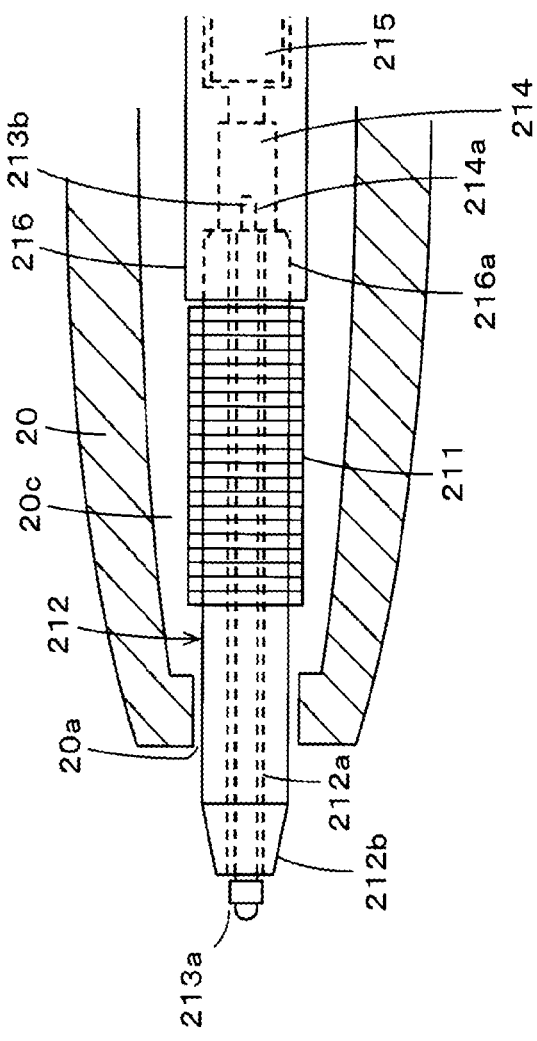

FIGS. 4A and 4B are diagrams for explaining a configuration example of the electronic pen main part 21. In the electronic pen main part 21 of this embodiment, as illustrated in FIG. 4A, the opposite side of the pen tip side of the ferrite core 212 around which the coil 211 is wound is coupled to a tubular body part 216 composed, for example, of resin.

As illustrated in FIG. 4A, the ferrite core 212 in this example is obtained by forming a through-hole 212a, which has a predetermined diameter r1 (for example, r1=1 mm) to receive the central rod 213 therein, along the axial center direction in a circular columnar shape ferrite material. A tapered part 212b that gradually tapers is formed on the pen tip side of the ferrite core 212, such that magnetic coupling with the position detection sensor 12 of the position detecting device 13 is stronger as compared with a case in which the ferrite core 212 does not include the tapered part 212b.

In this embodiment, the writing pressure detecting part 214 is disposed in the tubular body part 216 near the joint between the tubular body part 216 and the ferrite core 212.

The writing pressure detecting part 214 is configured with a semiconductor element which generates capacitance variation depending on the writing pressure, as disclosed in Japanese Patent Laid-open No. 2013-161307 for example. It is also possible for the writing pressure detecting part 214 to have a well-known mechanical configuration as described in Japanese Patent Laid-open No. 2011-186803 for example, to achieve a variable-capacitance capacitor whose capacitance changes according to the writing pressure.

A printed circuit board 217 is also housed in the tubular body part 216. The capacitor 215 that is connected in parallel to the coil 211 to form the resonant circuit is disposed on the printed circuit board 217. The variable-capacitance capacitor configured by the writing pressure detecting part 214 is configured to be connected in parallel with the capacitor 215, which is provided on the printed circuit board 217 to form the resonant circuit (see FIG. 7).

As illustrated in FIG. 4B, the opposite side of the pen tip side of the ferrite core 212 is fitted into a recessed part 216a formed in the tubular body part 216 and, as a result, the ferrite core 212 is coupled to the tubular body part 216. Although not illustrated, when coupling the ferrite core 212 to the tubular body part 216, one end 211a and another end 211b of the coil 211 are electrically connected in parallel with the capacitor 215, which is disposed on the printed circuit board 217 in the tubular body part 216 (see FIG. 7).

In this embodiment, the central rod 213 is a rod-shaped component with a diameter smaller than the inner diameter r1 of the through-hole 212a of the ferrite core 212, and has the pen tip at which the magnet part and the yoke part are disposed, as will be described in detail later. The length of the central rod 213 in the axial center direction is set longer than the length of the ferrite core 212 in the axial center direction. It should be noted that FIG. 4B and FIG. 3A illustrate the pen tip part 213a of the central rod 213, at which the yoke part is disposed as described later, as a part that clearly increases in a dimension (e.g., diameter) in a direction intersecting the axial center direction.

In this embodiment, as illustrated in FIG. 4B, the central rod 213 is inserted into the through-hole 212a of the ferrite core 212, and a tail end part 213b is fitted into a fitting hole 214a of the writing pressure detecting part 214. Therefore, the central rod 213 is directly fitted to the writing pressure detecting part 214. In the fitted state, the central rod 213 is held such that its pen tip part 213a protrudes from an opening of the ferrite core 212 on the tip side. This allows for creation of a magnetic pole on the pen tip part 213a of the central rod 213 at a position beyond and separate from a pen tip end of the ferrite core 212.

In this embodiment, as illustrated in FIG. 4B, the pen tip part 213a of the central rod 213 is made to protrude from the opening 20a of the casing 20 of the electronic pen 2 together with a pen tip side portion of the ferrite core 212. Accordingly, the writing pressure applied to the pen tip part 213a of the central rod 213 is directly transmitted to the writing pressure detecting part 214.

The electronic pen 2 of this embodiment receives, using the resonant circuit via electromagnetic induction coupling, an alternating-current signal having frequency f0 transmitted from the position detection sensor 12 of the position detecting device 13. Then, the resonant circuit of the electronic pen 2 returns the received alternating-current signal back to the position detection sensor 12 also via electromagnetic induction coupling. In the position detecting device 13, the position indicated by the electronic pen 2 is detected by detecting the position of the alternating-current signal returned from the electronic pen 2 on the position detection sensor 12. Further, the position detecting device 13 detects the writing pressure applied to the electronic pen 2 by detecting a change in the frequency or phase of the alternating-current signal received from the electronic pen 2.

To suitably perform the above-described interaction of the alternating-current signal between the electronic pen 2 and the position detection sensor 12 with a minimum energy loss, the resonant frequency of the resonant circuit of the electronic pen 2 may be selected to be equal to frequency f0 of the alternating-current signal from the position detecting device 13.

Configuration Example of Central Rod 213

Figure 5A:
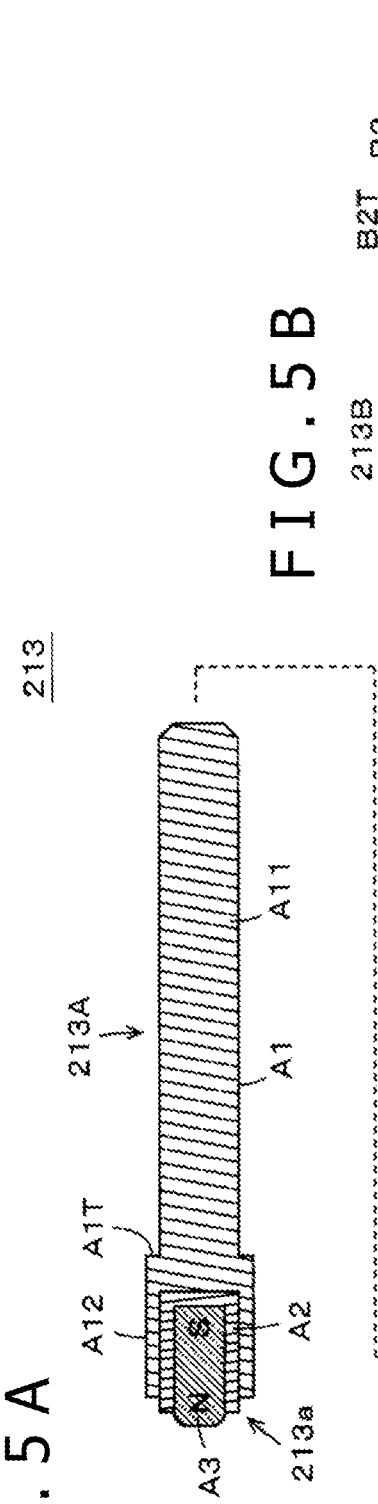
FIGS. 5A to 5C are diagrams for explaining an exemplary configuration of a central rod of the electronic pen that forms the handwriting input device according to the embodiment of the disclosure.
Figure 5B:
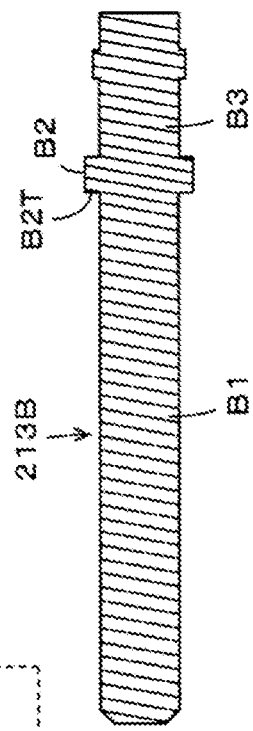
Figure 5C:
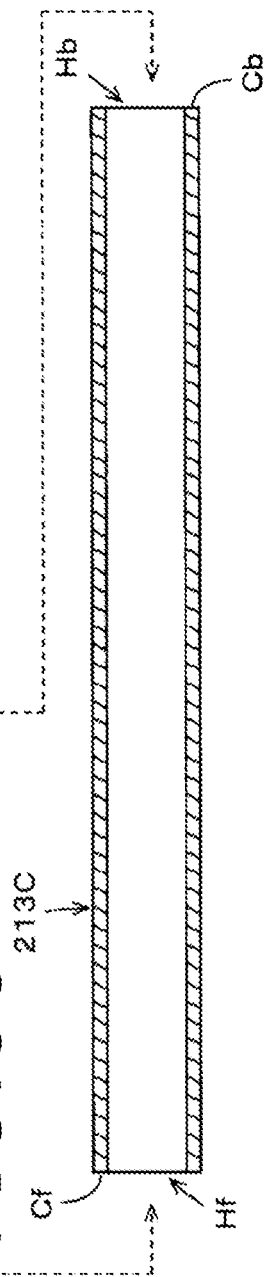

FIGS. 5A to 5C are diagrams for explaining a configuration example of the central rod 213 of the electronic pen 2 of this embodiment. As illustrated in FIGS. 5A to 5C, the central rod 213 is generally formed of three parts: a pen-tip-side shaft 213A (FIG. 5A), a rear-end-side shaft 213B (FIG. 5B), and a reinforcing pipe 213C (see FIG. 5C).

As illustrated in FIG. 5A, the pen-tip-side shaft 213A is composed of a joint part A1, a yoke part A2, and a magnet part A3. The joint part A1 is formed in a circular column shape using a polyether ether ketone (PEEK) resin, which has good shock resistance and exhibits superior insulation and dielectric characteristics over a broad frequency range. The joint part A1 includes a shaft A11 and a tip part A12, which has a greater outer diameter than the shaft A11. Thus, the bottom surface of the tip part A12 includes a projecting part A1T that radially projects from the outer edge of the shaft A11, to thereby function as a position-limiting part.

The tip part A12 is made into a cup shape by forming a recessed part on the rear end side to have an opening at the tip end side. The yoke part A2 is mounted in the recessed part of the tip part A12. The yoke part A2 has an outer appearance of a circular column shape, but is made in a cup shape having an opening by forming a recessed part inside the circular column shape. The yoke part A2 is fitted into the recessed part of the tip part A12 and is fixed with the opening of the yoke part A2 exposed to the tip side. The yoke part A2 may be a soft iron component that forms part of a magnetic circuit to control the path of magnetic flux.

The magnet part A3 having a circular column shape is fitted into the recessed part of the yoke part A2 and is fixed. A tip part of the magnet part A3 is configured to protrude from the opening of the yoke part A2. The magnet part A3 is a component of which the side that protrudes from the opening of the yoke part A2 is an N-pole and the opposite side is an S-pole. A magnetic circuit is formed by the magnet part A3 and the yoke part A2 and, as will be described in detail later, the yoke part A2 acts to bring an S-pole closer to the vicinity of the N-pole of the magnet part A3 to thereby control the path of magnetic flux generated by the magnet part A3. In this way, the pen tip part 213a of the central rod 213 is formed of the tip part A12 of the joint part A1, the yoke part A2, and the magnet part A3.

The rear-end-side shaft 213B is formed in a circular column shape using a PEEK resin and is composed of a shaft B1, a projecting part B2, and a fitting part B3. The projecting part B2 is a part that projects from the outer side of the shaft B1 and the outer side of the fitting part B3, to function as a position-limiting part. The part on the rear end side relative to the projecting part B2 is the fitting part B3, and the fitting part B3 fits into the fitting hole 214a of the writing pressure detecting part 214. A protrusion may be provided on the side surface of the fitting part B3 such that the fitting part B3 does not easily fall out once fitted to the fitting hole 214*a* of the writing pressure detecting part 214.

The reinforcing pipe 213C is a circular cylindrical tube that is formed of a metal such as stainless steel, for example, and is internally hollow. The inner diameter of the reinforcing pipe 213C is the same as or slightly smaller than the outer diameter of the shaft A11 of the joint part A1 of the pen-tip-side shaft 213A and the outer diameter of the shaft B1 of the rear-end-side shaft 213B. The outer diameter of the reinforcing pipe 213C is the same as the outer diameter of the tip part A12 of the joint part A1 of the pen-tip-side shaft 213A and the outer diameter of the projecting part B2 of the rear-end-side shaft 213B.

The shaft A11 of the pen-tip-side shaft 213A is inserted and pushed into a tip opening Hf of the reinforcing pipe 213C, and the projecting part A1T of the tip part A12 of the pen-tip-side shaft 213A abuts against a tip surface Cf of the reinforcing pipe 213C to be fixed thereto. Further, the shaft B1 of the rear-end-side shaft 213B is inserted and pushed into a rear end opening Hb of the reinforcing pipe 213C, and a pen-tip-side end surface B2T of the projecting part B2 of the rear-end-side shaft 213B abuts against a rear end surface Cb of the reinforcing pipe 213C to be fixed thereto.

In this way, the pen-tip-side shaft 213A is inserted into the front side of the reinforcing pipe 213C, and the rear-end-side shaft 213B is inserted into the rear side of the reinforcing pipe 213C. Thereby, the three components are assembled to form a unitary central rod 213. In this case, the shaft A11 of the pen-tip-side shaft 213A and the shaft B1 of the rear-end-side shaft 213B are located in the reinforcing pipe 213C, and therefore the strength of the central rod 213 as a whole is reinforced.

In the central rod 213 configured as described in FIGS. 5A to 5C, the magnet part A3 and the yoke part A2 are disposed at the tip part A12 of the joint part A1 of the pen-tip-side shaft 213A. Due to such configuration, a magnetic field generated by the magnet part A3 efficiently interacts with the magnetic sheet 11 while it is prevented from interfering with the position indication functionality of the electronic pen 2. Because the direct current magnetic field does not reach the rear end part of the central rod 213, the alternating magnetic field of the coil 211 and the ferrite core 212 on the rear end side is not affected.

Figure 6C:
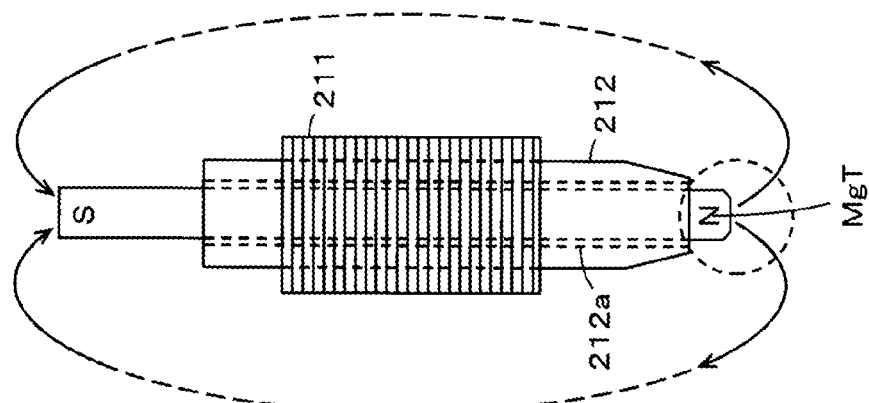
FIGS. 6A to 6C are diagrams illustrating a magnetic field generated by a magnetic circuit constituted by the central rod of the electronic pen, which forms the handwriting input device according to the embodiment of the disclosure.
Figure 6A:
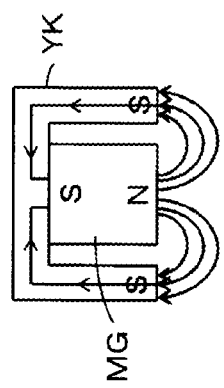
Figure 6B:
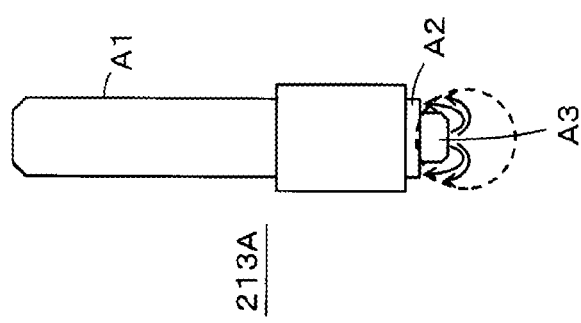

FIGS. 6A to 6C are diagrams illustrating the magnetic field generated by the magnetic circuit formed by the central rod 213 of the electronic pen 2. FIG. 6A is a diagram for explaining an example of a magnetic circuit formed by a magnet MG and a cup-shaped yoke YK. When the magnet MG is placed inside the yoke YK having a cup shape such that an N-pole is located on the opening side as illustrated in FIG. 6A, the yoke YK functions to make the S-pole closer to the N-pole. As a result, the path of magnetic flux can be controlled, and the magnetic circuit is formed in which magnetic force lines from the N-pole of the magnet MG pass through the yoke YK to enter the S-pole of the magnet MG. This serves to prevent magnetic flux from an external space from entering into the S-pole of the magnet MG.

A configuration similar to the one disclosed in FIG. 6A is mounted on the pen tip part of the electronic pen 2. Specifically, as illustrated in FIG. 6B, the cup-shaped yoke part A2 is fixed to the tip part A12 of the pen-tip-side shaft 213A, and the magnet part A3 is fixed in the yoke part A2 in such a manner that the tip end that is an N-pole is exposed. Accordingly, as illustrated in FIG. 6B, a magnetic circuit is formed in which magnetic force lines from the N-pole of the magnet part A3 pass through the yoke part A2 and enter an S-pole of the magnet part A3. Thus, the magnetic flux of the magnet part A3 can be controlled so as to extend over a very limited range at the tip side, as illustrated by a dotted-line circle in FIG. 6B, without causing the magnetic field of the magnet part A3 to reach the S-pole side of the magnet part A3. Therefore, the magnetic flux generated by the magnet part A3 can efficiently act on the magnetic sheet, without interfering with the position indication functionality of the electronic pen 2.

For example, consider a case in which a magnet MgT is employed as the central rod itself that penetrates the ferrite core 212 in the axial center direction as illustrated in FIG. 6C. When the central rod MgT formed of the magnet is inserted into the through-hole 212*a* of the ferrite core 212, the magnetic property of the ferrite core 212 diminishes due to a direct-current magnetic field of the magnet, and correspondingly the inductance value of the coil 211 decreases. Thus, even if the resonant frequency of the resonant circuit composed of the coil 211 and the capacitor 215 is selected to be equal to frequency f0 of the alternating-current signal transmitted from the position detecting device 13, an effective resonant frequency becomes higher than frequency f0 by an amount $\Delta f$ which corresponds to a decrease in the inductance of the coil 211.

Thus, in a case of configuring an electronic pen by using the central rod MgT made of a magnet, the amount of decrease in the inductance of the coil 211 due to the central rod MgT formed of the magnet needs to be considered in advance, and the resonant frequency of the resonant circuit composed of the coil 211 and the capacitor 215 needs to be selected to be frequency f1 (<f0) which is lower than frequency f0 of the alternating-current signal transmitted from the position detecting device 13. If this is done, in a state in which the central rod MgT is inserted in the through-hole 212*a* of the ferrite core 212, the effective resonant frequency of the resonant circuit formed of the coil 211 and the capacitor 215 becomes equal to frequency f0.

However, in a case of the electronic pen 2 of the present embodiment, due to the configuration including the magnet part A3 and the yoke part A2 at the pen tip part A12, a decrease in the inductance of the coil 211 is not caused even when the central rod 213 is inserted into the ferrite core 212. This eliminates the need to make a special arrangement such as shifting the resonant frequency of the electronic pen 2 in advance in order to allow the coordinate position indicated by the electronic pen 2 to be detected with accuracy equivalent to conventional accuracy in the position detecting device 13.

Further, in a case of the configuration illustrated in FIG. 6C, the magnetic flux range becomes a wide range, as illustrated by a dotted-line circle in FIG. 6C. Therefore, the iron powder 113Fe in the microcapsules 113 of the magnetic sheet 11 tends to react quickly to execute drawing, before the central rod MgT comes into contact with the handwriting input surface 1A. In this case, the magnetic flux acts on a wider range to thereby deteriorate the contrast of the drawing, such as blurring the outer edge of a drawn line. However, in a case of the electronic pen 2 of the present embodiment, the magnetic flux generated by the magnet part A3 can be confined into a very small range due to a function of the yoke part A2, as illustrated by the dotted-line circle in FIG. 6B. Therefore, unintentional rendering of drawing can be avoided, and the contrast of the drawing is improved.

Moreover, in the electronic pen 2 of this embodiment, at the time of use in which the pen tip part 213*a* of the central rod 213 of the electronic pen main part 21 protrudes to the outside, not only the central rod 213 but also a portion of the ferrite core 212 protrudes from the opening 20*a* of the casing 20 as illustrated in FIG. 4B, and the distance from the tip of the tapered part 212b of the ferrite core 212 to the input surface of the position detection sensor 12 becomes short.

Therefore, according to the electronic pen 2 of this embodiment, electromagnetic coupling with the position detection sensor 12 becomes strong compared with the conventional electronic pen in which the ferrite core 212 is kept inside the hollow part of the casing 20. Moreover, in this embodiment, the tip part side of the ferrite core 212 is made into the tapered part 212b. Therefore, the cross-sectional area of the tip of the ferrite core 212 becomes small, and the magnetic flux density becomes higher, which allows for strong electromagnetic coupling with the position detection sensor 12.

Therefore, the electronic pen 2 of this embodiment can form a strong electromagnetic coupling with the position detection sensor 12 even when the electronic pen 2 is made thinner, and it becomes possible to detect the position indicated by the electronic pen 2 with high sensitivity in the position detecting device 13. It should be noted that, as in the electronic pen of the existing type, it is possible to configure the ferrite core 212 to be confined in the hollow part of the casing 20 while making the pen tip part 213a of the central rod 213 protrude from the casing 20. The magnetic field generated by the magnet part A3 of the pen tip part 213a does not affect the alternating-current magnetic field used for position detection and, therefore, the position detection functionality is not negatively affected even when the electronic pen is configured to house the ferrite core 212 in the hollow part of the casing 20.

Installation of Eraser Functional Part

Referring to FIG. 1, it is possible to arrange an eraser functional part 22 indicated by a dotted line, on the side of a rear end surface 20b of the electronic pen 2 including the electronic pen main part 21. The eraser functional part 22 may be configured similarly to the electronic pen main part 21 as described above. Specifically, the eraser functional 22 may be configured by inserting a central rod, configured similarly to the central rod 213 described in FIGS. 5A to 5C, in a through-hole defined in a ferrite core, around which a coil is wound. In the eraser functional part 22, a magnet part at a tip of the central rod is arranged such that an S-pole side protrudes from an opening of a cup-shaped yoke part, while an N-pole side is located on the bottom surface side of the yoke part. That is, the magnet part of the central rod of the eraser functional part 22 has magnetic poles which are reversed relative to those of the electronic pen main part 21.

Suppose that the tip part of the central rod of the eraser functional part 22 configured as above is brought close to or into contact with the magnetic sheet 11 so as to trace over a written trace that appears on the front surface of the magnetic sheet 11. That is, on the front surface of the magnetic sheet 11, the written trace is displayed due to the iron powder 113Fe in the microcapsules 113 which has been attracted by the N magnetic pole of the pen tip part 213a of the central rod 213 of the electronic pen main part 21 to be magnetized an S-pole. The magnetized iron powder 113Fe is repelled from the front surface of the magnetic sheet 11 by the S magnetic pole of the tip part of the central rod of the eraser functional part 22, and the written trace is erased.

In the position detecting device 13 of the handwriting input device of this embodiment, besides the above-described alternating-current signal having frequency f0 for writing input detection, an alternating-current signal having frequency f2 f0), which allows for detection of a feedback signal which is a signal indicating erasure instruction and which is clearly distinguishable from frequency f0, is transmitted to the electronic pen 2 through the position detection sensor 12. A coil of the eraser functional part 22 of the electronic pen 2 is connected in parallel to a capacitor to form a resonant circuit. The resonant frequency of this resonant circuit of the eraser functional part 22 is set to be equal to frequency f2 of the above-described alternating-current signal for detection of an erasure instruction, and receives the alternating-current signal having frequency f2 from the position detecting device 13 and feeds it back to the position detection sensor 12.

In a state in which the user places the central rod of the eraser functional part 22 of the electronic pen 2 close to or in contact with the front surface of the magnetic sheet 11, the alternating-current signal for detection of an erasure instruction from the position detecting device 13 is received by the resonant circuit of the eraser functional part 22 is fed back as an alternating-current signal having frequency f2. Thus, the position detecting device 13, by receiving the feedback signal through the position detection sensor 12 and detecting the position of the signal reception on the position detection sensor 12, may detect the coordinate position of where an erasure instruction is made.

In this way, in the handwriting input device of the present embodiment, by bringing the pen tip part 213a of the electronic pen main part 21 of the electronic pen 2 close to or in contact with the handwriting input surface 1A, a written trace can be formed and displayed on the front surface of the magnetic sheet 11. In addition, electronic data of the written trace (e.g., written content data and writing pressure data) can be detected and stored.

When the electronic pen 2 is provided with the eraser functional part 22, by bringing the tip part of the central rod of the eraser functional part 22 close to or in contact with the handwriting input surface 1A and moving the tip part to follow (trace) the written trace displayed on the front surface of the magnetic sheet 11, the written trace displayed on the front surface of the magnetic sheet 11 can be erased, and the corresponding written content data and writing pressure data can be deleted from the storage.

When a written trace displayed on the magnetic sheet 11 is erased by using the eraser 3 for the magnetic sheet 11, written content data and writing pressure data stored in the position detecting device 13 are not erased because the position detecting device 13 cannot detect the position of the eraser 3.

When writing (drawing) using the electronic pen main part 21 and erasing a written trace using the eraser functional part 22, frequency f0 is used for writing input detection and frequency f2 is used for erasure input. Thus, for the position detecting device 13, a transmission-reception period (a transmission period and a reception period) for the alternating-current signal having frequency f0 for writing input detection and a transmission-reception period (a transmission period and a reception period) for the alternating-current signal having frequency f2 for erasure input are provided in a time-division manner.

The electronic pen main part 21 and the eraser functional part 22 each include a writing pressure detecting part and transmit a signal including writing pressure information. Thus, a signal having frequency f0 is transmitted from the position detecting device 13 in the transmission period of the alternating-current signal having frequency f0 for writing input detection. Due to resonance action in response thereto, in the reception period of the alternating-current signal having frequency f0 for writing input detection, a signal having frequency f0 is transmitted from the electronic pen main part 21 when the pen tip part 213a has not yet come in contact with the operation surface. From the electronic pen main part 21 when the pen tip part 213a is in contact with the operation surface, in the reception period of the alternating-current signal having frequency f0 for writing input detection, a signal having frequency f0' including writing pressure information is transmitted.

Similarly, a signal having frequency f2 is transmitted from the position detecting device 13 in the transmission period of the alternating-current signal having frequency f2 for erasure input. Due to resonance action in response thereto, in the reception period of the alternating-current signal having frequency f2 for erasure input detection, a signal having frequency f2 is transmitted from the eraser functional part 22 when the eraser tip part has not yet come in contact with the operation surface. From the eraser functional part 22 when the eraser tip part is in contact with the operation surface, in the reception period of the alternating-current signal having frequency f2 for erasure input detection, a signal having frequency f2' including writing pressure information is transmitted.

Accordingly, in the transmission-reception period of the alternating-current signal having frequency f0 for writing input detection, detection of the alternating-current signal having frequency f2 or f2' for erasure input is not performed, and writing (drawing) alone can be performed. In the transmission-reception period of the alternating-current signal having frequency f2 for erasure input detection, detection of the alternating-current signal having frequency f0 or f0' for writing input is not performed, and only erasure of written traces can be performed.

In a case in which both writing by the electronic pen main part 21 and erasure of written traces by the eraser functional part 22 are enabled, the electronic pen main part 21 and the eraser functional part 22 can be similarly configured, as long as they satisfy the following three conditions. First, the magnetic poles of the tip of the central rod should be reversed between the electronic pen main part 21 and the eraser functional part 22. Second, different frequencies should be used which allow for clearly distinguishing the resonant frequencies between the electronic pen main part 21 and the eraser functional part. Third, the transmission-reception period of the alternating-current signal having the frequency for writing input detection, and the transmission-reception period of the alternating-current signal having the frequency for erasure input, should be provided in a time-division manner for the position detecting device 13 so as to allow for both writing by the electronic pen main part 21 and erasure of written traces by the eraser functional part 22.

Configuration Example of Electronic Circuit of Handwriting Input Device

Figure 7:
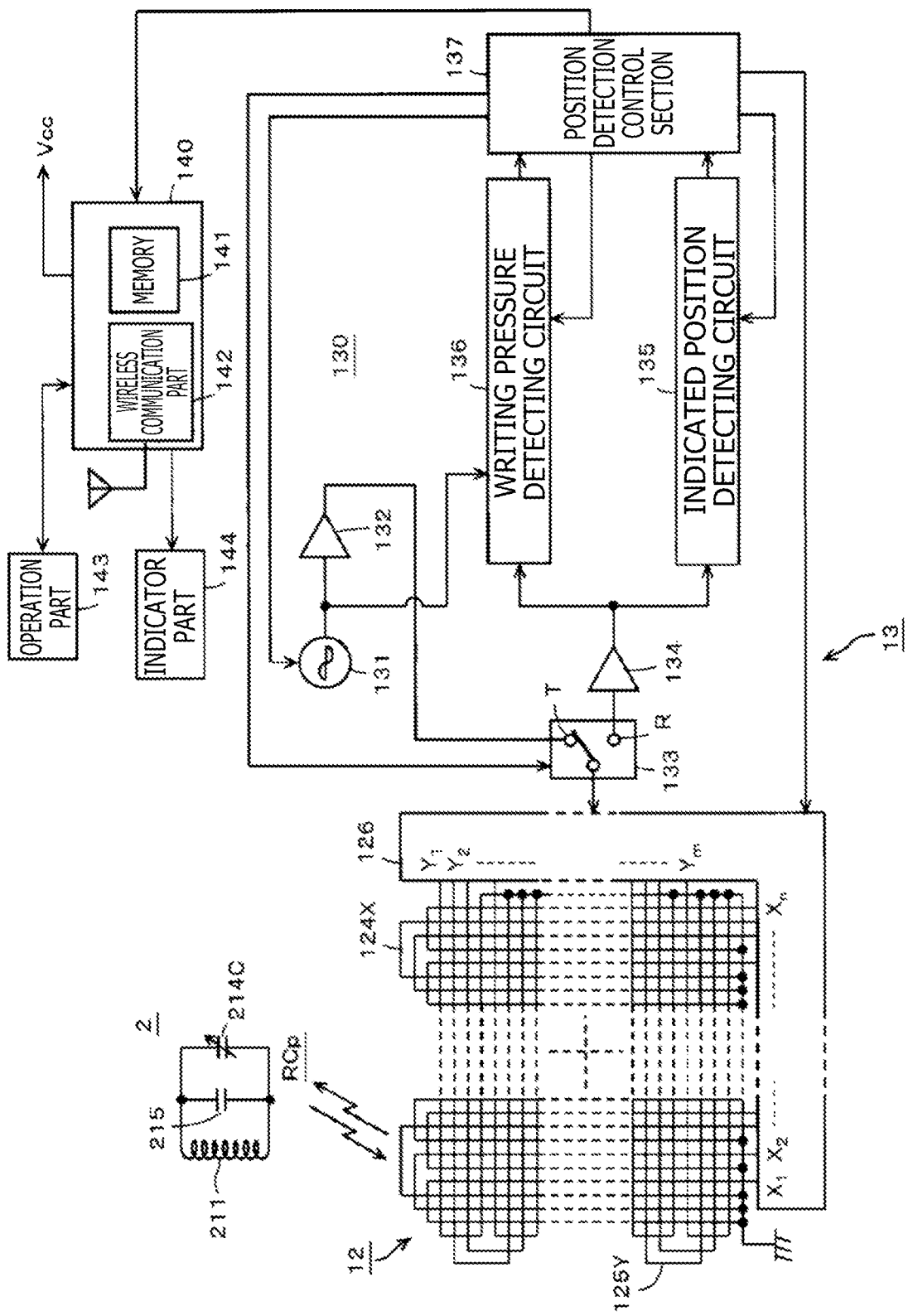
FIG. 7 is a block diagram illustrating an exemplary configuration of an electronic circuit of the handwriting input device according to the embodiment of the disclosure.

FIG. 7 is a diagram illustrating an electronic circuit configuration of the tablet terminal 1 and the electronic pen 2 that form the handwriting input device of the present embodiment. As described above, it is possible to dispose the eraser functional part 22 on the side of the rear end surface 20b of the electronic pen 2. For ease of description, the following describes the configuration and operation of the tablet terminal when it is used to receive a writing input from the electronic pen main part 21.

As illustrated in FIG. 7, the electronic pen 2 includes a resonant circuit RCp of the electronic pen main part 21 configured by the coil 211, the capacitor 215, and a variable-capacitance capacitor 214C formed of the writing pressure detecting part 214.

When the pen tip part 213a of the central rod 213 of the electronic pen main part 21 of the electronic pen 2 is brought close to or into contact with the handwriting input surface 1A of the tablet terminal 1, the resonant circuit RCp forms an electromagnetic induction coupling with the position detection sensor 12 and exchanges an alternating-current signal having frequency f0.

An X-axis direction loop coil group 124X and a Y-axis direction loop coil group 125Y are formed in the position detection sensor 12 of the position detecting device 13. A position detecting circuit 130 of the position detecting device 13 transmits a signal to the resonant circuit RCp of the electronic pen 2, by electromagnetic coupling through the X-axis direction loop coil group 124X and the Y-axis direction loop coil group 125Y of the position detection sensor 12. The position detecting circuit 130 transmits the alternating-current signal having frequency f0 to the electronic pen 2 through the position detection sensor 12.

In the electronic pen 2, when the pen tip part 213a of the central rod 213 of the electronic pen main part 21 is brought close to or into contact with the handwriting input surface 1A of the tablet terminal 1, the resonant circuit RCp receives the alternating-current signal having frequency f0 from the position detection sensor 12 and an alternating-current signal is fed back from the resonant circuit RCp to the position detection sensor 12.

In the position detecting circuit 130, the feedback signal from the resonant circuit RCp of the electronic pen 2 is received through the position detection sensor 12 by electromagnetic coupling. Then, the position detecting circuit 130 detects the position on the position detection sensor 12 indicated by the electronic pen 2 based on the position on the position detection sensor 12 at which the received signal is detected. Further, the position detecting circuit 130 detects a change in the resonant frequency of the resonant circuit RCp by detecting a phase change of the signal received from the electronic pen 2, and detects the writing pressure applied to the central rod 213 of the electronic pen main part 21 of the electronic pen 2.

In the position detecting circuit 130, a position detection control section 137 is arranged that controls position detection processing and writing pressure detection processing, to be described below. An oscillator 131 generates a signal having the oscillation frequency f0. In the position detecting circuit 130, a selection circuit 126 is disposed to which the X-axis direction loop coil group 124X and the Y-axis direction loop coil group 125Y of the position detection sensor 12 are connected. The selection circuit 126 sequentially selects one loop coil in the two loop coil groups 124X and 125Y to cause transmission of a signal to the resonant circuit RCp and cause reception of a signal fed back from the resonant circuit RCp.

A switching circuit 133 is connected to the selection circuit 126 and is controlled by the position detection control section 137. When the switching circuit 133 is connected to a transmission-side terminal T, an alternating-current signal is supplied from the oscillator 131 to the selection circuit 126. When the switching circuit 133 is connected to a reception-side terminal R, a signal from the selection circuit 126 is supplied, through an amplifier 134, to an indicated position detecting circuit 135 and a writing pressure detecting circuit 136.

The indicated position detecting circuit 135 executes detection of an induced voltage generated in the loop coil of the position detection sensor 12, that is, detection of a received signal, and converts the detection output signal to a digital signal to be output to the position detection control section 137. The position detection control section 137 calculates the coordinate values of the indicated position of the electronic pen 2 in the X-axis direction and the Y-axis direction on the basis of the digital signal from the indicated position detecting circuit 135, that is, the level of the voltage value of the induced voltage generated in each loop coil.

The writing pressure detecting circuit 136 executes synchronous detection of an output signal from the receiving amplifier 134 with the alternating-current signal from the oscillator 131, obtains a signal having a level corresponding to the phase difference (a frequency deviation) therebetween, and converts the signal corresponding to the phase difference (the frequency deviation) to a digital signal to be output to the position detection control section 137. The position detection control section 137 detects the writing pressure applied to the central rod 213 of the electronic pen main part 21 of the electronic pen 2 on the basis of the digital signal from the writing pressure detecting circuit 136, that is, the level of the signal corresponding to the phase difference (the frequency deviation) between the transmitted electric wave and the received electric wave.

The position detection control section 137 supplies the coordinate data of the detected indicated position of the electronic pen 2 as written content data to a control part 140 together with the detected writing pressure data.

The control part 140 includes a memory 141 and a wireless communication part 142. Further, the control part 140 includes a rechargeable battery, a charging circuit, and a power supply circuit, though illustration thereof is omitted. To the control part 140, an operation part 143 is connected, which includes the power button 1Ba, the writing input finish button 1Bb, and the information transmission button 1Bc arranged in the operation panel part 1B (see FIG. 1). Also connected to the control part 140 is an indicator part 144 composed of the power indicator 1Bd and the communication indicator 1Be (see FIG. 1).

When the power button 1Ba of the operation part 143 is turned on based on a pressing-down operation, the control part 140 generates a supply voltage Vcc and supplies it to various parts to thereby set the tablet terminal 1 in an operational state. At this time, the control part 140 turns on the power indicator 1Bd to inform the user of the power-on state. When the power button 1Ba is pressed down again, powering-off is instructed, and the control part 140 stops supplying the supply voltage Vcc to various parts to thereby set the tablet terminal 1 in a non-operational state. The power indicator 1Bd is turned off.

The control part 140 stores the written content data and the writing pressure data received from the position detection control section 137 in the memory 141. When detecting pressing-down of the writing input finish button 1Bb performed by the user, the control part 140 records a set of the written content data and the writing pressure data, which has been stored in the memory 141 by that time, as data of one page. At this time, page identification information is assigned to the data of one page.

After pressing down the writing input finish button 1Bb, the user may erase the written traces displayed on the front surface of the magnetic sheet 11 using the eraser 3, and may perform new handwriting input. At this time, because the eraser 3 is used to erase the written traces displayed on the front surface of the magnetic sheet 11, the written content data in units of pages as stored in the memory 141 are not erased by the control part 140.

When the user performs new writing input by using the electronic pen 2 after erasing all of written traces that appear on the front surface of the magnetic sheet 11 in the above-described manner, the control part 140 stores the new written content data and new writing pressure data in the memory 141. Then, when the user presses down the writing input finish button 1Bb, the written content data and the writing pressure data newly stored in the memory 141 are stored in the memory 141 as data of another page.

In the present embodiment, the control part 140 includes the wireless communication part 142, and wireless communication with, for example, a server device formed of a computer is enabled. When the user performs a pressing-down operation of the information transmission button 1Bc of the operation panel part 1B of the tablet terminal 1 in an environment in which wireless communication with the server device is possible, the control part 140 transmits written content data and writing pressure data in units of pages stored in the memory 141 to the server device and erases the memory 141. At this time, when transmitting the written content data and the writing pressure data to the server device, the control part 140 turns on the communication indicator 1Be to inform the user that the written content data and the writing pressure data are being transmitted to the server device.

The control part 140 may be configured to automatically transmit written content data and writing pressure data in units of pages to the server device when a pressing-down operation of the writing input finish button 1Bb is performed, instead of transmitting the written content data and the writing pressure data in units of pages stored in the memory 141 to the server device in response to an operation of the information transmission button 1Bc by the user. In this case, the information transmission button 1Bc does not have to be provided.

Technical Effects

According to the handwriting input device of the above-described embodiment, writing input using the electronic pen 2 on the handwriting input surface 1A is performed, and electronic data of the writing input including written content data and writing pressure data is obtained. Moreover, the electronic pen 2 includes the central rod 213 in which the magnet part A3 and the yoke part A2 are disposed at the pen tip part. Thus, the magnetic sheet 11 configured to express a written trace based on an effect of a magnetic field can be used as a display part. Therefore, a display panel such as an LCD is not necessary, and an inexpensive handwriting input device can be realized.

Further, due to the inclusion of the magnet part A3 and the yoke part A2 at the pen tip part 213a of the central rod 213, a magnetic circuit is formed, and a magnetic field is generated to affect only a very limited range. Thus, the part of the central rod 213 other than the pen tip part 213a does not have to be a magnet and, therefore, the central rod 213 does not affect the alternating-current magnetic field (alternating magnetic field) for position indication. As such, it is not necessary to address, for example, the issue of a resonant frequency shift.

Although a magnet is generally vulnerable to shock, the magnet part A3 is exposed at a very small part at the tip of the pen tip part 213a, and therefore the central rod 213 is resistant to shock. Thus, the central rod 213 does not easily break even when a user carries the electronic pen 2 around and drops it. In addition, due to use of the magnetic sheet 11, a written trace can be easily erased by using the eraser 3 or using the eraser functional part 22 arranged on the electronic pen 2. Therefore, the handwriting input device can be highly portable and easy to use as it does not produce eraser crumbs.

Except for that the magnet part A3 and the yoke part A2 are disposed at the pen tip part 213a of the central rod 213, the electronic pen 2 that forms the handwriting input device of the present embodiment can be configured similarly to the existing electronic pen of the electromagnetic induction type and thus can be manufactured for low cost. In addition, as the position detection sensor 12 and the position detecting circuit 130 of the position detecting device 13 of the handwriting input device of the above-described embodiment, the existing position detection sensor and position detecting circuit of the electromagnetic induction type can be used, as is.

Modification Examples

While the central rod 213 of the electronic pen 2 of the above-described embodiment is formed of the pen-tip-side shaft 213A, the rear-end-side shaft 213B, and the reinforcing pipe 213C, the central rod 213 is not limited to such configuration. For example, it is also possible to configure a central rod by disposing the magnet part A3 and the yoke part A2 at the tip of a single shaft formed of any suitable material, such as a hard resin including polyacetal (POM), and use it as the central rod for the electronic pen 2.

Further, it is also possible to configure a central rod by disposing the magnet part A3 and the yoke part A2 at the tip of a single shaft formed of any suitable material such as a hard resin, and reinforce the part other than the pen tip part and the rear end part of the central rod by using a reinforcing pipe, to thereby provide the central rod for the electronic pen 2. That is, for the central rod 213 including the magnet part A3 and the yoke part A2 disposed at the pen tip part, the part other than the pen tip part can be configured with any suitable material other than a magnet, which might interfere with the magnetic field (alternating-current magnetic field) for position indication.

It is also possible to provide a guide pipe that penetrates in the through-hole 212a of the ferrite core 212 and to insert the central rod 213 in the guide pipe. This configuration protects the ferrite core 212 and facilitates sliding movement of the central rod 213 in the axial center direction. In addition, this configuration protects the central rod when the reinforcing pipe 213C is not provided.

The size and shape of the magnet part A3 and the yoke part A2 can be set in various manners. For example, the tip of the magnet part A3 may be processed into a hemispherical shape. It is also possible to form the magnet part A3 and the yoke part A2 into a polygonal prism shape. Further modifications are also possible.

The invention claimed is:

1. An electronic pen, configured to transmit and receive a signal to and from a position detection sensor by electromagnetic induction, the electronic pen comprising:
a coil;
a magnetic core around which the coil is wound, the magnetic core having a through-hole in an axial center direction;
a capacitor that forms a resonant circuit with the coil; and
a central rod that is inserted in the through-hole of the magnetic core,
wherein,
the central rod includes a magnet part and a yoke part that holds the magnet part at a pen tip part of the central rod, and
the electronic pen further comprises a magnet disposed at a rear end of the electronic pen, the magnet having a magnetic pole opposite to a magnetic pole of the magnet part disposed at the pen tip part of the central rod.

2. The electronic pen according to claim 1, wherein the electronic pen is configured for use in a state in which at least the pen tip part of the central rod at which the magnet part and the yoke part are disposed protrudes from an electronic pen casing.

3. The electronic pen according to claim 1, wherein the electronic pen is configured for use in a state in which a tip of the magnetic core and the pen tip part of the central rod at which the magnet part and the yoke part are disposed protrude from an electronic pen casing.

4. The electronic pen according to claim 1, wherein the central rod is configured with the magnet part and the yoke part disposed at a tip of a shaft.

5. The electronic pen according to claim 1, wherein,
the central rod includes a shaft,
the magnet part and the yoke part are disposed at a tip part of the shaft; and
a middle part of the shaft excluding the tip part at which the magnet part and the yoke part are disposed and a rear end part of the shaft is housed in a reinforcing pipe.

6. The electronic pen according to claim 1, wherein,
the central rod includes a pen-tip-side shaft and a rear-end-side shaft,
the magnet part and the yoke part are disposed at a tip part of the pen-tip-side shaft,
a proximal part of the pen-tip-side shaft excluding the tip part at which the magnet part and the yoke part are disposed is housed in a reinforcing pipe; and
a distal part of the rear-end-side shaft excluding a rear end part of the rear-end-side shaft is housed in the reinforcing pipe.

7. The electronic pen according to claim 1, wherein,
the magnet part is a columnar component in which an N-pole and an S-pole are aligned along the axial center direction; and
the yoke part is a cup-shaped component having an opening at a tip, through which a tip part of the magnet part protrudes when the magnet part is held by the cup-shaped component.

8. The electronic pen according to claim 1, further comprising:
a second resonant circuit disposed at the rear end of the electronic pen, the second resonant circuit having a resonant frequency different from that of the resonant circuit of the electronic pen.

9. A handwriting input device, comprising:
a position detecting device including:
a magnetic sheet on which a color of a position changes when a magnetic pole nears or contacts the position, and
a position detection sensor of an electromagnetic induction type disposed
under the magnetic sheet in an overlapping manner; and
an electronic pen including:
a coil,
a magnetic core around which the coil is wound, the magnetic core having a through-hole in an axial center direction,
a capacitor that forms a resonant circuit with the coil,
a central rod inserted in the through-hole of the magnetic core, the central rod having a magnet part and a yoke part that holds the magnet part at a pen tip part of the central rod, and a magnet disposed at a rear end of the electronic pen, the magnet having a magnetic pole opposite to a magnetic pole of the magnet part disposed at the pen tip part of the central rod;

wherein, the position detection sensor of the position detecting device exchanges a signal, which has a frequency corresponding to a resonant frequency of the resonant circuit, with the resonant circuit of the electronic pen, via electromagnetic induction coupling.

10. The handwriting input device according to claim 9, wherein the magnetic sheet includes a layer of microcapsules containing powder formed of magnetic material; and on the magnetic sheet, at a position which a magnetic pole at the pen tip part of the central rod of the electronic pen nears or contacts, the powder formed of magnetic material in the layer of the magnetic sheet is magnetically attracted to the magnetic pole to cause a color change at the position on a front surface of the magnetic sheet.

11. The handwriting input device according to claim 10, further comprising:

an eraser configured to undue the color change at the position on the magnetic sheet, by returning the powder in the microcapsules in a vicinity of the position to its original location.

12. A central rod for an electronic pen, the central rod comprising:

a pen tip part; and a shaft, wherein, the pen tip part has a magnet part and a yoke part that holds the magnet part, and a magnet is disposed at a rear end of the electronic pen, the magnet having a magnetic pole opposite to a magnetic pole of the magnet part disposed at the pen tip part of the central rod.

13. The central rod for an electronic pen according to claim 12, wherein, the magnet part is a columnar component in which an N-pole and an S-pole are aligned along an axial center direction; and the yoke part is a cup-shaped component having an opening at a tip, through which a tip part of the magnet part protrudes when the magnet part is held by the cup-shaped component.

14. The central rod for an electronic pen according to claim 12, wherein the shaft is composed of a non-magnetic material.

* * * * *